July 21, 1953 — W. R. BENNETT ET AL — 2,646,343
METHOD OF PRODUCING CALCIUM CHLORIDE PELLETS
Filed Nov. 24, 1950
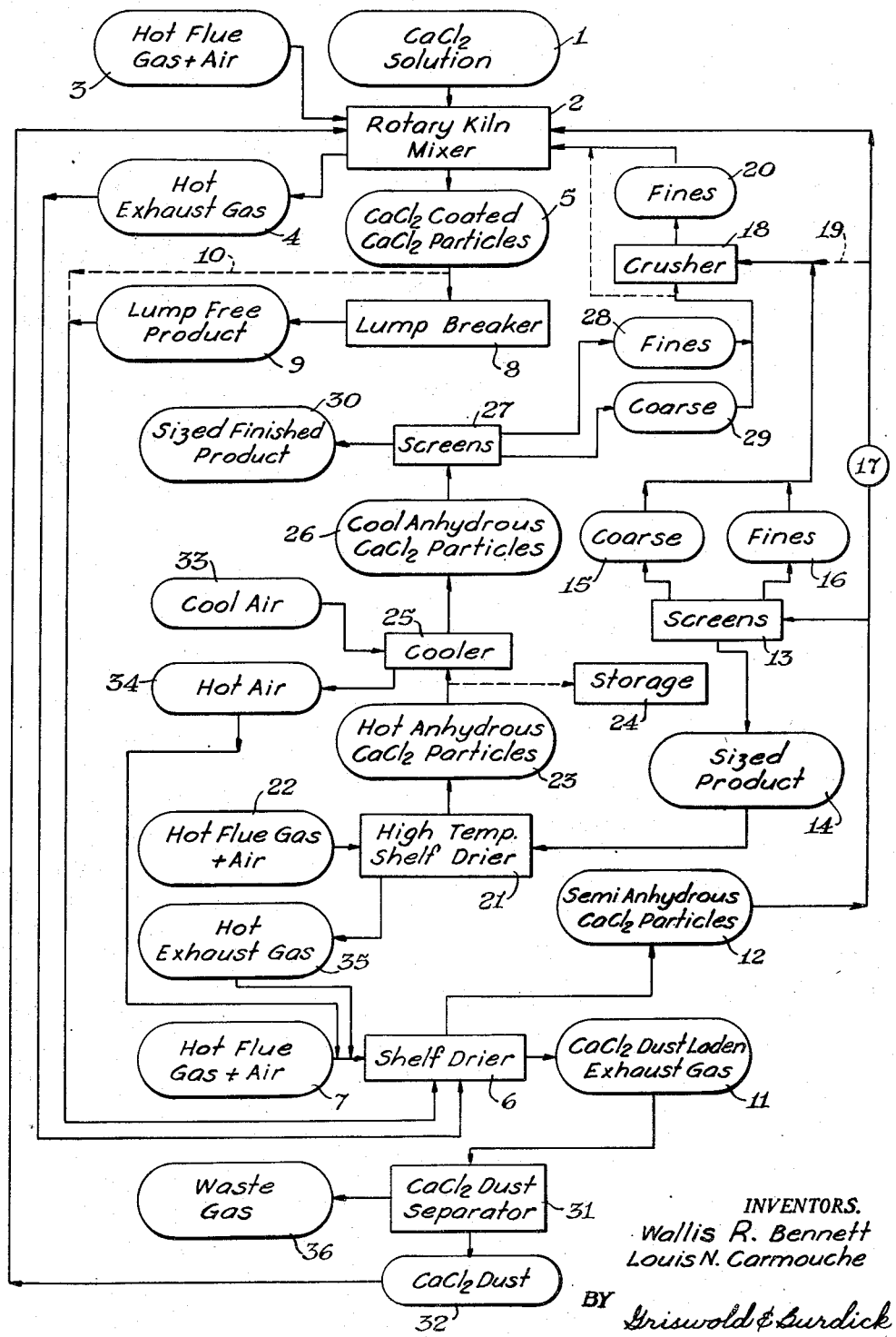
INVENTORS.
Wallis R. Bennett
Louis N. Carmouche
BY Griswold & Burdick
ATTORNEYS Patented July 21, 1953

2,646,343

UNITED STATES PATENT OFFICE 2,646,343

METHOD OF PRODUCING CALCIUM CHLORIDE PELLETS

Wallis R. Bennett, Midland, and Louis N. Carmouche, Ludington, Mich., assignors to The Dow Chemical Company, Midland, Mich., a corporation of Delaware Application November 24, 1950, Serial No. 197,222

3 Claims. (Cl. 23—90)

The invention relates to an improved calcium chloride product and method of producing the same from an aqueous solution. It more particularly concerns an improved calcium chloride product which is substantially anhydrous and in rounded dense free-flowing substantially non-dusting particles having a high bulk density and the method of producing the same from a hot concentrated aqueous solution of the chloride.

In the conventional method of obtaining a solid particulate form of calcium chloride from its aqueous solution, the solution is concentrated by vacuum evaporation until a slurry of crystals of the dihydrate and concentrated mother liquor is obtained. The mixture of crystals and the mother liquor is subjected to further evaporation by boiling down in open kettles. The melt thus obtained is solidified on a cooled flaker drum, thereby obtaining a flaked form of the chloride containing somewhat more than 2 moles of water per mole of calcium chloride. The flaked product is then further dried in a revolving kiln which yields a flaked product containing about 20 per cent of water of crystallization. The kiln dried flaked product is sized by screening out both the under and over size particles which may be returned to the kettles for reworking.

One of the principal uses of the flaked product thus obtained is in allaying dust upon roads. The product is usually shipped to the point of use in reinforced waterproofed paper sacks or in bulk in suitable cars and spread upon or mixed with the material the dust of which is to be allayed. Dust allaying results from the absorption by the dust of the liquid produced in situ by the deliquescing action of the flaked product.

A number of disadvantages inure to these practices. One of them is that the conventional flaked calcium chloride contains a substantial proportion of combined water per unit volume of the material. As a result, packaging, storage, and shipping costs per unit volume of the material per pound of calcium chloride therein are relatively costly. Rendering the material anhydrous by further drying does not overcome this disadvantage because the resulting anhydrous material occupies as much space as the flaked form before such drying. Another disadvantage is that the conventional flaked product is friable and abrades during handling and shipping. This causes a loss of material which is easily carried away by air currents when it is attempted to spread the material upon a road surface for example. Rendering the material anhydrous accentuates these difficulties. Still another disadvantage is that the conventional material absorbs water with excessive rapidity. As a consequence, in dust allaying for example, oftentimes the solution produced in situ by the deliquescing material runs off at least in part before it has time to be fully absorbed by the dust to be allayed. A further disadvantage is that the conventional material cannot be stored for long in bulk storage without severe caking or massing into a monolithic form in which the particles are no longer free-flowing.

One of the principal objects of the present invention is to provide a product and method of producing the same which overcomes the foregoing disadvantages, although other objects and advantages will become apparent as the description of the invention proceeds.

In brief, the method contemplated by the invention comprises applying in heated condition the calcium chloride solution, from which the chloride is to be recovered, to hot solid calcium chloride in the form of a mixture of particles graded as to size including a substantial proportion of calcium chloride dust particles, said particles having been derived and recycled from later steps in the method and containing less than about 13 per cent of water of crystallization, so as to coat and impregnate the particles with the solution while they are rolled on each other in the presence of a heated drying atmosphere. The application of the hot calcium chloride solution to the hot mixture of particles causes the smaller particles to become attached to the larger ones as by the cementing action of the solution, which gives up a part of its water to the heated drying atmosphere. The solution thereby becomes distributed upon and absorbed by the particles which assume the form of pellets. The solution treated pellet-like particles thus obtained are subjected to a drying operation in a current of heated drying gases which produces a semi-anhydrous product in the form of pellets, fines, and dust containing less than about 13 per cent of water of crystallization. A major portion of the semi-anhydrous product is recycled to the first step aforesaid for retreatment with the calcium chloride solution. The recycling results in further and repeated coating and impregnation of the particles with the calcium chloride solution, thereby cementing the dust and fines to the large particles and increasing their density, and roundness of form. The remainder or minor portion of the semi-anhydrous product freed from dust and fines is subjected to an intensive drying in a current of heated gases so as to produce a substantially anhydrous product. The substantially anhydrous product thereby obtained may be sent to storage as a final product and allowed to cool therein. Preferably, the anhydrous product is cooled in a current of ordinary air, and, before storing or packaging, the off-size particles are screened out and returned to the first step.

Unlike the conventional flaked form of semi-anhydrous calcium chloride, the substantially anhydrous particles of the invention are rounded, having the form of pellets. They are hard and relatively smooth, thereby resisting crushing and abrasion in all the usual handling operations. Their bulk density and calcium chloride content are high, thereby reducing shipping, storing, and packaging costs per unit weight of calcium chloride content. Their rate of deliquescence is low, thereby providing ample time for absorption by a dusty surface of the solution formed when the product thereon deliquesces. When stored for considerable lengths of time in an open container, only the layer of particles which is directly exposed to the atmosphere may deliquesce leaving the bulk of the particles in a free-flowing condition.

The invention then consists of the improved product and method of producing the same herein fully described and particularly pointed out in the claims, reference being had to the annexed drawing.

In the said drawing, the single figure is a schematic diagram illustrating a combination of steps in a mode of carrying out the invention.

The calcium chloride solution, from which the chloride is to be recovered in accordance with the invention, may contain from about 50 per cent of calcium chloride by weight to as much as 72 per cent, depending upon its temperature so as to be preferably free from undissolved chloride. The presence of small amounts of alkali metal chlorides in solution, e. g. potassium chloride and sodium chloride, normally present as impurities in commercial sources of calcium chloride, may be tolerated in amount up to about 6 per cent by weight of the solution. If present in the solution, these chlorides are recovered along with the calcium chloride and form a part of the product. The effectiveness of the product for dust alloying is not impaired by amounts of the alkali chloride up to about 6 per cent which, in these amounts have substantially the same water absorbing characteristics as pure calcium chloride. The product thus comprises calcium chloride of at least 94 per cent purity, and is substantially free from water. A preferred proportion of water in the calcium chloride solution on which to practice the method is about 35 to 45 per cent by weight, the balance being chlorides of which at least about 96 per cent by weight is calcium chloride. In what follows and in the appended claims, the term "calcium chloride" is used broadly to mean both the pure substance and the impure commercial product containing up to about 6 per cent of other chlorides as impurities.

In carrying out the invention, the calcium chloride solution, if not already heated, as by the evaporator in which the solution is concentrated, is brought to a temperature preferably at least within 25 centigrade degrees of its atmospheric boiling point. Referring to the drawing, the hot calcium chloride solution 1, from which the water is to be removed and the calcium chloride recovered, is mixed with hot semi-anhydrous calcium chloride particles substantially all in the form of pellets and dust derived or recycled from later steps in the method. Substantially all the said semi-anhydrous particles pass a No. 3 standard sieve. More or less anhydrous off-size particles screened out of the final product may also be returned to this step. The mixing of the solution with the particles is achieved by subjecting them to a rolling motion, whereby the particles roll on each other and take up the solution while it is sprayed upon them. In carrying out this step, the calcium chloride particles may be introduced into one end of a slightly sloping rotary kiln type of drier or mixer 2 and then rolled and tumbled therein to produce a mixing action as by maintaining an inventory of particles in the kiln and spraying the solution onto the particles in the kiln as it is rotated. While being thus mixed with the solution, the particles are kept hot as by hot flue gases 3 diluted with air and directed through the kiln in contact with the particles. The hot gases may be derived from the burning of a suitable fuel, such as coal, oil, or gas, the resulting flue gases being mixed with sufficient air so that the temperature of the gases brought into contact with the particles is at least about 200° C. but not in excess of 500° C. At these temperatures, a considerable proportion of water is removed by the hot exhaust gases 4 leaving the kiln mixer. As a result, although the particles receive a coating of calcium chloride solution with which they become mixed, they do not remain wet with the solution. Instead, only enough solution is used so that it is more or less absorbed by the particles without producing a noticeably wet mixture. Thus applied, the solution acts to more or less hydrate the particles. In the mixing operation, the smaller particles disappear and become a part of the others which acquire the form of dense pellets as the particles tumble and roll on each other while being sprayed repeatedly in heated condition with the solution. A small proportion of lumps, too large to be classified as pellets, may also form. During this operation, the temperature of the particles is about 150° to 190° C., although a preferable operating temperature is 170° to 175° C.

The hot rounded calcium chloride treated particles or pellets 5 obtained from the mixing operation, as by withdrawing them from the opposite end of the kiln mixer 2, are subjected to a first stage of drying as in a drier 6 preferably of the shelf-type in which the particles are spread out over a supporting surface and gently raked while being subjected to the drying action, by direct contact, of a current of hot combustion or flue gases 7, suitably diluted with air. These hot gases may also be mixed with the hot waste gases from other steps in the method, as will later appear. It is desirable, if not necessary, to break up the larger lumps which may form along with the pellets as aforesaid, as by a lump breaker 8, to produce a more or less lump-free product 9 before the calcium chloride treated particles are subjected to the first stage of drying. If desired, this lump breaking operation may be by-passed, as indicated by the dotted line 10, as when lumps are absent. The particles subjected to the first stage of drying are at substantially the same temperature as when being treated with the calcium chloride solution, and after drying, leave the drier 6 at about 160° to 190° C. The particles 5 are thus subjected to an amount of drying in the first stage which removes a large proportion of the water to be removed, forming a product of porous semi-anhydrous particles having a water content of about 3 to 13 per cent by weight. Some of the porous semi-anhydrous product is in the form of dust entrained in the exhaust drying gas 11. The dust particles are of various sizes substantially all smaller than 50 microns. The remainder 12 consists of particles (mostly in the form of pellets) too large to be entrained in the drying gas, their size being such that at least 80 per cent remains upon a standard 40 mesh sieve.

Following the first stage of drying, a portion of the resulting semi-anhydrous product, exclusive of the dust, i. e. product 12, is passed through a set of screens 13 so as to obtain a sufficient amount of the desired size of pellets for final drying to the anhydrous condition. In this screening operation, particles coarser than about 3 mesh and finer than about 20 mesh are removed leaving a sized semi-anhydrous product 14 for final drying. The amount of the sized material 14 is such that its total chloride content, less that of the dust produced on final drying, corresponds to the total chloride content of the calcium chloride solution 1 introduced into the system. The balance of the semi-anhydrous material is recycled. Exclusive of the dust, this includes the coarse particles 15, fine particles 16, as well as the unscreened portion 17. The course particles 15, with which fines 16 may be combined, are passed through a crusher 18 to reduce the particle size of the coarse particles to below about 3 mesh. Portion 17 of the semi-anhydrous product may be returned directly to the mixing step. As lumps may be present in this material, it is preferable to divert some or all of it through the crusher 18, as indicated by dotted line 19, which will crush the lumps. In addition, this crusher provides a means to reduce to fines any desired portion of the semi-anhydrous product diverted to the crusher. Such diversion provides a means for controlling the proportion of fines, exclusive of dust, used in the first step. The product coming from the crusher 18, or fines 20, is delivered to the first step of the method. The sized product 14, which is substantially all in the form of pellets, is subjected to a second stage of drying at a relatively high temperature as in the high temperature drier 21, which may be of the shelf-type similar to that of the drier 6.

Such drying is effected by direct contact with hot combustion or flue gases suitably diluted with air to produce a drying gas mixture 22 having a temperature between about 250° and 500° C., a temperature of about 450° C. being generally suitable. Drying is continued until a substantially anhydrous product 23 is obtained, the dried particles thereof being in the same pelleted form as before drying. Their temperature is about 180°–300° C.

The hot substantially anhydrous particles 23 may be sent to storage 24 as a final product and therein allowed to cool, or cooled by direct contact with a stream of cool air, as in a cooler 25, until the temperature of the particles falls to about 40° to 50° C. The cooled product 26, may be conveyed to screens, 27, which remove the fines, 28, and the coarse particles, 29, leaving a cool sized finished product, 30, having a particle size between suitable maximum and minimum limits. We have found that best results are had when all the sized final product will pass through a No. 3 standard sieve with not more than about 5 per cent passing through a No. 20 standard sieve. The fines 28 and coarse particles 29 are returned to the mixer 2 preferably through crusher 18, although if the coarse particles are not excessively large, the crushing step may be by-passed as indicated by the dotted line around crusher 18.

The bulk density of the so-sized final product is at least 55 pounds per cubic foot and may be as high as 65 pounds per cubic foot. The particles of the final product are rounded, free-flowing and hard. The particles resist abrasion and may be handled, as in shipping and use, without excessive dust formation. The product only slowly deliquesces and does not cake as rapidly as the conventional form of calcium chloride. For example, a given sample of the final product placed in an atmosphere having a temperature of 70° F. and relative humidity of 60 per cent will be only about 60 per cent dissolved by deliquescence in the time (8 hours) required for a similar weight of the conventional flake form of calcium chloride to become completely dissolved by deliquescence. The final product has the unique advantage of being shippable in conventional railroad tank cars because of its unusually pronounced free-flowing characteristic which permits easy filling of cars or other containers and is also easily removable from railroad tank cars by dissolving with cold water due to the very high heat of solution of the product which results in the formation of a hot concentrated solution when cold water is added. Shipment of the final product in conventional box cars and covered hopper cars is also feasible because the product does not cake or form a monolithic body under usual shipping conditions.

The final product has the further advantage of being substantially dust free, the dust formed during the prior screening and drying operations being carried off in the drying gases, particularly the dust laden exhaust gases 11 leaving the first drying stage (shelf drier 6), as already mentioned. The calcium chloride dust entrained in the drying gases is recovered for use in the method, as by passing the dust laden exhaust gases 11 through a suitable separator 31, such as a cyclone type of dust separator. The calcium chloride dust 32 removed from these gases is returned to mixer kiln 2 of the first step in the method, thereby providing a source of very fine calcium chloride particles, in addition to other fines, e. g. 20, which become mixed with and attached to the larger or sized semi-anhydrous particles 14 upon being recycled following the application to them of the calcium chloride solution in the said first step.

As already mentioned, the proportion of fines 20 coming from the crusher 18 and delivered to the first step, 2, is subject to control by diverting to the crusher 18 (along path 19) more or less of the unscreened portion 17 of semi-anhydrous particles 12. Generally, sufficient fines as dust (e. g. 32), is available from the calcium chloride dust laden exhaust gases 11 from the first stage of drying to operate the method without the need for creating additional fines by crushing more or less of the portion 17 of the semi-anhydrous product 12. However, we have found that satisfactory results are had by regulating the amount of fines, including the recycled dust, in relation to the amount of calcium chloride solution 1 to be applied thereto in the first step 2 to a proportion such that the product of calcium chloride solution-coated particles, e. g. 5, is neither excessively fine nor coarse but has a particle size such that at least about 70 per cent remains on a Number 20 standard sieve while over 80 per cent passes through a No. 3 standard sieve. The actual proportions used can be best ascertained by trial. They are evidenced not only by obtaining the desired particle sizes but also by the appearance of the mixture as it is made which is substantially dry due to absorption of the calcium chloride solution by the particles when sufficient fines have been used. Fines (exclusive of dust) separated from the product of the first stage of drying, e. g. fines 16, if in excess of the amount needed for recycling to obtain proper absorption of the calcium chloride solution and the production of the desired particle sizes in the mixer, may be diverted from the mixing step and reused by dissolving any desired portion thereof in the incoming calcium chloride solution 1 instead of adding these fines to the mixer 2 through the crusher 13 as shown. An excessive amount of dust separated from the drying gases may be similarly recycled instead of delivering all of it to the mixing step. An inventory of particles undergoing treatment in the mixing operation is maintained in the mixing zone in amount between about 0.5 to 2 per cent of the throughput, about 1 per cent is preferred, of the mixing step.

In operating the cooler 25 in which cool air 33 is brought into contact with the hot anhydrous calcium chloride particles 23 so as to cool them, it is desirable to reclaim the resulting hot air 34, as by adding it to the hot flue gas-air mixture 7 going to the shelf drier 6. Also, the hot exhaust gas 35 from the high temperature drying taking place in high temperature drier 21 may be similarly recovered by directing it to the drier 6. Recovering these gases, besides saving heat, has the further advantage of conserving calcium chloride dust which may be entrained in these gases. Substantially all such entrained dust, including that entrained in the exhaust gases from the second stage of drying, finally becomes entrained in the exhaust gases 11 leaving the drier 6 and is substantially all recovered by the dust separator 31 for use in the first step of the method. The small amount, if any, of calcium chloride dust which may escape from the separator 31 by entrainment in the discarded waste gas 36, may be scrubbed out of these gases with water and recovered, if desired, as a calcium chloride solution. In normal operation, the proportion of calcium chloride converted into dust and returned to the rotary mixer kiln 2 is about 5 to 15 per cent of the weight of the calcium chloride introduced into the process from the calcium chloride solution 1.

The recycle ratio, that is, the ratio of the weight of the total chloride in the semi-anhydrous chloride particles including the returned calcium chloride dust on which the incoming calcium chloride solution is applied, to the weight of the total chloride in the incoming calcium chloride solution used in the first or mixing step 2 of the method, may vary over a range such as between about 8:1 and 30:1.

The following example is illustrative of the practice of the invention.

Example

A solution, from which the calcium chloride is to be recovered, contains 34.7 per cent of water and 65.3 per cent of chlorides of which 96.5 per cent is calcium chloride.

The solution is sprayed into a rotating kiln mixer continuously at the rate of 2.34 gallons per minute (20.75 tons of solution per day), the spray being directed upon solid calcium chloride particles therein and derived from later steps in the method and introduced into one end of the mixer at a substantially uniform rate. There is an inventory in the mixer of about 2 tons of material undergoing mixing. The particles brought to the mixer comprise 205.31 tons per day of semi-anhydrous particles having a size between about 3 and 20 mesh, 2.19 tons per day of semi-anhydrous particles (dust) having a size below about 30 microns, and 0.2 ton per day of anhydrous particles. The semi-anhydrous particles including dust having an average water content of 4.4 per cent and temperature of about 170° C. Drying gas consisting of air-diluted flue gas at a temperature of 300° C. is directed through the mixer in contact with the material undergoing spraying and mixing. A mixed calcium chloride product, in the form of pellets, is produced thereby and withdrawn from the mixer at the rate of 224.95 tons per day. At the same time, 3.5 tons per day of water is carried off in the drying gases as water vapor. The pelleted product contains about 5.5 per cent of water and its temperature is about 170° C.

The pelleted product of the mixer is delivered to a shelf drier at the rate of 224.95 tons per day and subjected to drying action of drying gases introduced into the drier at about 250° C. The pelleted product is raked while in the drier and the resulting semi-anhydrous pelleted product is removed from the drier at the rate of 219.73 tons per day. It contains 4.4 per cent of water. The drying gas carries out the drier 3.05 tons per day of water vapor removed from the pellets. Also removed from the drier are 2.75 tons of semi-anhydrous calcium chloride as dust entrained in the drying gases exhausted from the shelf drier. The dust contains 1.4 per cent of water. A portion of the semi-anhydrous pelleted product, viz. 174.41 tons per day, is returned directly to the kiln mixer (corresponds to portion 17 of Fig. 1), the remainder, viz. 45.32 tons per day, is screened (screens 13 of Fig. 1), thereby removing a total of 30.9 tons per day of particles over 3 mesh and under 20 mesh which are returned to the mixing step, leaving a balance of 14.42 tons per day of semi-anhydrous pellets, graded as to size, which is subjected to final drying.

In the final drying, drying gases of hot flue gas mixed with air are passed over the semi-anhydrous pellets spread out in a layer about 6 inches deep in a shelf drier and gently raked while drying. The gases have a temperature of 450° C. entering the drier and 300° C. on leaving. The exhaust gas is delivered to the first mentioned shelf drier for use as a portion of the drying gas therein. Anhydrous product is withdrawn from the final drying operation at the rate of about 13.2 tons per day. The anhydrous product is screened to remove particles larger than 3 mesh and smaller than 20 mesh. These particles are screened out at the rate of about 0.2 ton per day and are returned to the first mixing step. The screened final product is obtained at the rate of 13 tons per day in the form of dense hard smooth rounded pellets having a bulk density of about 57 pounds per cubic foot.

In the foregoing example, it will be apparent that there is fed to the mixing step the following amounts of solids: 174.4 tons per day of unscreened semi-anhydrous pellets, 30.9 tons per day of coarse and fine screenings of semi-anhydrous particles, 2.19 tons per day of semi-anhydrous calcium chloride dust, and about 0.2 ton per day of screenings of anhydrous particles.

The total chloride content of each of these solid materials is 166.9, 29.5, 2.16, and 0.2 ton per day, respectively, or a total of 198.8 tons per day of chlorides as solid materials. The solution fed to the mixing step amounts to 20.75 tons per day and introduces 13.55 tons per day of calcium chloride. The total amount of chlorides introduced into the mixer per day is, therefore, 212.3 tons. From these data, the relative amounts of the various solid materials fed to the mixing step are as follows: The semi-anhydrous material, in the form of the unscreened product from the first drying operation comprising lumps, pellets, and fines (exclusive of dust) amounts to 84 per cent; the screened out coarse and fine particles (exclusive of dust) amounts to 14.9 per cent; the dust amounts to 1.0 per cent; and the returned off-size anhydrous particles amount to 0.1 per cent. The calcium chloride content of these solids amounts to 93.3 per cent of all the calcium chloride fed to the mixing step which includes the chloride from the input calcium chloride solution and all the recycled material. The calcium chloride in the solution fed to the mixing step amounts to 6.7 per cent by weight of the calcium chloride throughput of the mixing zone. The recycle ratio of the example is 212.3÷13.55 or 15.7.

The amount of water removed in the various operations may be varied to some extent. In the first or mixing step of the method, the removal of a substantial proportion of the total water content of the materials undergoing mixing is desirable, the amount so-removed may amount to as much as 60 per cent of the water content of the calcium chloride solution introduced in the mixing zone. A preferable amount to remove in the first step is from 25 to 55 per cent of the water content of the incoming calcium chloride solution.

In the first stage of drying the solid calcium chloride solution-treated particles resulting from the mixing step are dried to a semi-anhydrous stage in which the water content of the particles is in general about 3 per cent to as much as 13 per cent. A preferable water content of the semi-anhydrous material is between about 3 and 6 per cent. The amount of water removed in this stage of drying may amount to as much as 55 per cent of the water content of the incoming calcium chloride solution.

In the final drying in which the solid semi-anhydrous particles are rendered substantially anhydrous, the water remaining in the semi-anhydrous material is substantially if not completely all removed, although as much as 2% of water may be left in the product. The water thus removed may amount to as much as 20 per cent of the water content of the incoming calcium chloride solution, although it is preferable to prepare the semi-anhydrous material with a water content such that on final drying the amount of water to be removed is only about 5 to 10 per cent of the water content of the incoming calcium chloride solution.

We claim:

1. In a method of producing a substantially anhydrous calcium chloride product in continuous manner in the form of dense hard pellets from an aqueous solution of calcium chloride, said solution containing not less than 50 per cent of calcium chloride, the steps which consist in maintaining at a temperature between 150° and 190° C. in a mixing zone a mass of semi-anhydrous particles of the said chloride derived from later steps in the method; spraying the solution at a temperature within 25 centigrade degrees of its atmospheric boiling point onto the said mass of semi-anhydrous particles while subjecting them to a tumbling rolling motion in the presence of a drying gas having a temperature between 200° and 500° C. and being capable of abstracting moisture from the said mass, said mass having a weight between about 0.07 and 0.4 of the weight of the daily input of the calcium chloride in the calcium chloride solution; introducing into the mixing zone semi-anhydrous calcium chloride particles derived from later steps in the method at a rate between about 8 and 30 times that of the calcium chloride in the solution; subjecting the resulting mixture at a temperature between 150° and 190° C. to the drying action of a heated drying gas capable of abstracting moisture therefrom so as to produce a semi-anhydrous product containing from 3 to 13 per cent of water; subjecting a portion of the semi-anhydrous product to the drying action of a drying gas having a temperature of 250° to 500° C. so as to render the product anhydrous, the portion so-dried being substantially the amount of the calcium chloride content of the incoming calcium chloride solution; and returning the remainder of the semi-anhydrous product to the mixing zone.

2. In a method of producing a substantially anhydrous calcium chloride product in a continuous manner in the form of dense hard pellets from an aqueous solution of calcium chloride, said solution containing not less than 50 per cent of calcium chloride, the steps which consist in maintaining at a temperature between 150° and 190° C. in a mixing zone a mass of previously prepared semi-anhydrous particles of the solid chloride derived from later steps in the method; spraying the solution at a temperature within 25 centigrade degrees of its atmospheric boiling point onto the said mass of semi-anhydrous particles while subjecting them to a tumbling rolling motion in the presence of a drying gas having a temperature between 200° and 500° C. and being capable of abstracting moisture from the said mass, said mass having a weight between about 0.07 to 0.4 of the weight of the daily input of the calcium chloride in the calcium chloride solution; introducing into the mixing zone semi-anhydrous calcium chloride particles derived from later steps in the method at a rate between about 8 and 30 times that of the calcium chloride in the calcium chloride solution; subjecting the resulting mixture at a temperature between 150° and 190° C. to the drying action of a heated drying gas capable of abstracting moisture therefrom so as to produce a semi-anhydrous product containing from 3 to 13 per cent of water; separating from the semi-anhydrous product particles larger than about 3 mesh and those smaller than about 20 mesh; subjecting a portion of the resulting sized semi-anhydrous material to the drying action of a drying gas having a temperature of 250° to 500° C. so as to render the product anhydrous, the portion so-dried being substantially the amount of the calcium chloride content of the calcium chloride solution; and returning the remainder of the semi-anhydrous product including the separated coarse and fine particles to the mixing zone.

3. In a method of producing substantially anhydrous calcium chloride in the form of hard pellets from an aqueous solution of calcium chloride containing not less than 50 per cent of calcium chloride, the steps which consist in spraying the solution at a temperature within 25 centigrade degrees of its atmosphere boiling point onto solid particles of semi-anhydrous calcium chloride derived subsequently in the method, the solid particles having a temperature between 150° and 190° C. while tumbling and rolling the particles on each other in the presence of a current of a drying gas having a temperature of 200° to 500° C., the amount of the solid particles of semi-anhydrous calcium chloride relative to that of the calcium chloride solution sprayed thereon being at least sufficient to absorb the solution without producing a noticeably wet mixture whereby the particles receive a solid coating comprising calcium chloride and acquire a pellet form; subjecting the resulting product to the drying action of a heated drying gas so as to remove a portion of the water of crystallization from the pellets, thereby forming a semi-anhydrous product in pellet form, the temperature of the product during the said drying action being between about 160° and 190° C.; subjecting a minor portion of the semi-anhydrous pellets so-obtained to the drying action of a current of a heated drying gas so as to remove substantially all of the remaining water of crystallization, thereby forming a substantially anhydrous product in pellet form, the product during such drying having a temperature between 180° and 300° C.; and delivering the remainder of the semi-anhydrous product to the first step to supply thereto the solid particles of semi-anhydrous calcium chloride.

WALLIS R. BENNETT.
LOUIS N. CARMOUCHE.

References Cited in the file of this patent

UNITED STATES PATENTS

| Number | Name | Date |
|---|---|---|
| 1,354,279 | Browne | Sept. 28, 1920 |
| 1,458,651 | Goldschmidt | June 12, 1923 |
| 1,527,121 | Cottringer | Feb. 17, 1925 |
| 1,592,971 | Dow | July 20, 1926 |
| 1,660,053 | Smith | Feb. 21, 1928 |
| 1,764,582 | Staib | June 17, 1930 |
| 1,763,282 | Barstow | June 24, 1930 |
| 1,869,906 | Martin | Aug. 2, 1932 |
| 1,877,733 | Martin | Sept. 13, 1932 |
| 1,907,076 | Martin | May 2, 1933 |
| 1,958,034 | Collings | May 8, 1934 |
| 2,154,671 | Downs | Apr. 18, 1939 |
| 2,297,300 | Hardesty | Sept. 29, 1943 |
| 2,340,567 | Sargent | Feb. 1, 1944 |

OTHER REFERENCES

J. W. Mellor's "Inorg. and Theoretical Chem.," vol. 3, page 700. Longmans, Green & Co., N. Y.

"Hackh's Chem. Dictionary," page 157, 3rd ed. The Blakiston Co., Philadelphia.